United States Patent [19]

Michie et al.

[11] Patent Number: 4,932,990
[45] Date of Patent: Jun. 12, 1990

[54] METHODS OF MAKING OPTICAL FIBER AND PRODUCTS PRODUCED THEREBY

[75] Inventors: Michael M. Michie, Alpharetta; Quang D. Nguyen, Lilburn; Albert J. Ritger, Lawrenceville, all of Ga.

[73] Assignee: AT&T Bell Laboratories, Murray Hill, N.J.

[21] Appl. No.: 410,004

[22] Filed: Sep. 19, 1989

Related U.S. Application Data

[63] Continuation-in-part of Ser. No. 256,099, Oct. 11, 1988, abandoned, which is a continuation of Ser. No. 79,732, Jul. 30, 1987, abandoned.

[51] Int. Cl.$^5$ ............................................ C03B 37/018
[52] U.S. Cl. ................................. 65/3.12; 350/96.31; 427/163
[58] Field of Search ...................... 65/2, 3, 11, 3.12; 427/163; 350/96.31

[56] References Cited

U.S. PATENT DOCUMENTS

| 405,198 | 8/1877 | Rau et al. ........................ 65/33 |
| 3,982,916 | 9/1976 | Miller .............................. 65/3.12 |
| 4,087,266 | 5/1978 | Irven et al. ........................ 65/2 |
| 4,217,027 | 8/1980 | MacChesney et al. ........... 350/96.3 |
| 4,257,797 | 3/1981 | Andrejco et al. ................. 65/3.12 |
| 4,389,229 | 6/1985 | Jang et al. ....................... 65/3.12 |
| 4,389,230 | 6/1983 | Modone et al. .................. 65/3.12 |
| 4,478,623 | 10/1984 | Olshasky ......................... 65/3.12 |
| 4,518,407 | 5/1985 | Black et al. ...................... 65/3.12 |
| 4,579,571 | 1/1986 | Hicks .............................. 65/3.12 |
| 4,596,589 | 6/1986 | Perry .............................. 65/3.12 |

FOREIGN PATENT DOCUMENTS 055822 11/1981 European Pat. Off. .
3215791 4/1982 Fed. Rep. of Germany .

OTHER PUBLICATIONS

*Applied Optics*, "Pulse Brodening Caused By Deviations From The Optimal Index Profile", R. Olshansky, vol. 15, No. 3, Mar. 1976.
*Applied Optics*, "Effects of Profile Deformations on Fiber Bandwidth", D. Marcuse et al., vol. 18, No. 22, 15 Nov. 1979.
*Applied Optics*, "Calculated Pulse Responses of Perturbed Fiber Profiles", B. Stoltz et al., vol. 21, No. 23, 1 Dec. 1982.

*Primary Examiner*—Robert L. Lindsay
*Attorney, Agent, or Firm*—Edward W. Somers

[57] ABSTRACT

An improved multimode optical fiber having substantially higher bandwidth and lower loss is made by controlling process parameters such as the volume of the silica which is deposited in each pass of a torch assembly (41) along a substrate tube (31) to form a preform tube which is collapsed to provide a preform (80) from which the optical fiber is drawn. As a result, the amplitude variation of the refractive index across each layer is controlled to be within desired limits. Should the volume of the silica deposited in each pass be controlled to control the amplitude variation, the thicknesses of the outermost deposited glassy layers in the preform tube are greater and those of the innermost layers are less than those of layers in a preform tube made by prior art MCVD processes. Because the difference in the index of refraction across each glassy layer is reduced, the bandwidth is enhanced and the loss of the drawn optical fiber is reduced over those properties of optical fiber drawn from preforms made by prior art MCVD processes. Inasmuch as the inventive process also allows a higher deposition rate than before, it may be used to produce single-mode optical fiber at lower costs than before achieved.

19 Claims, 6 Drawing Sheets

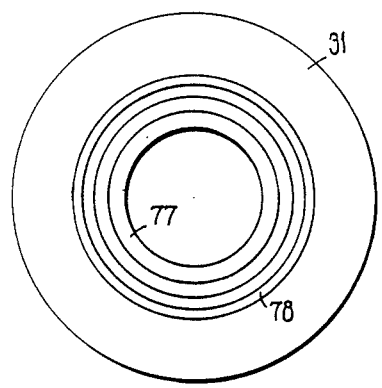
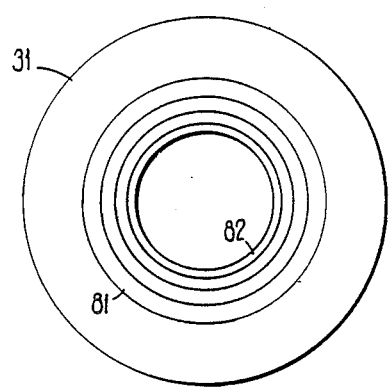
PRIOR ART
FIG 5A            FIG 6A
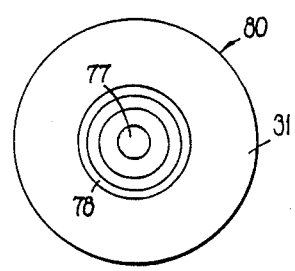
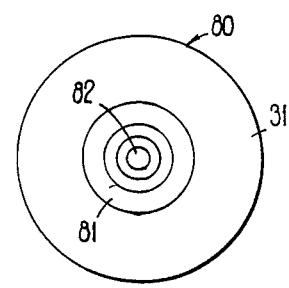
PRIOR ART
FIG 5B            FIG 6B

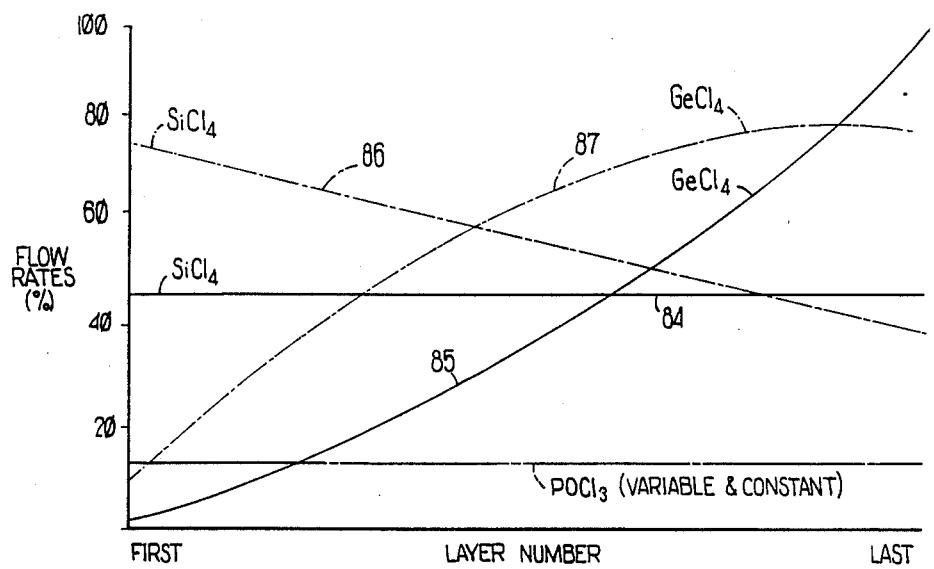
FIG. 8
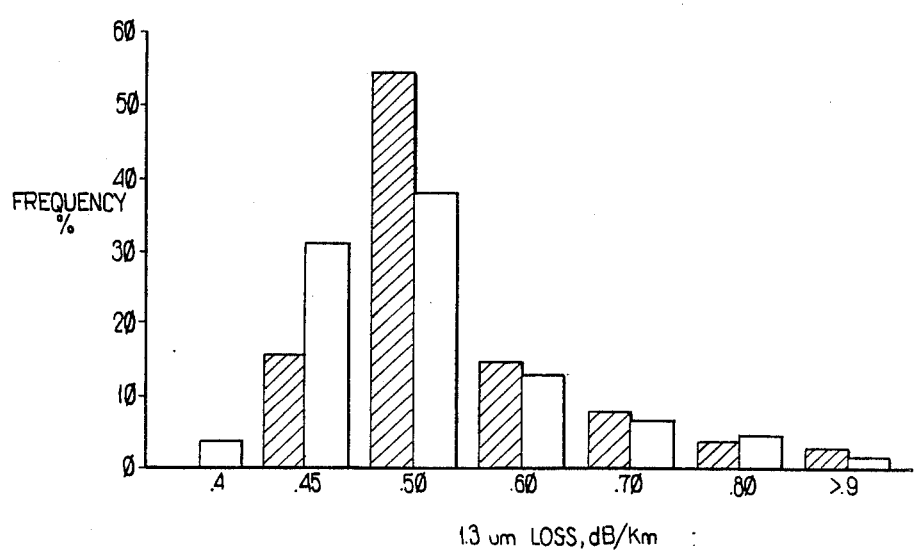
FIG. 9 (PRIOR ART ▨)

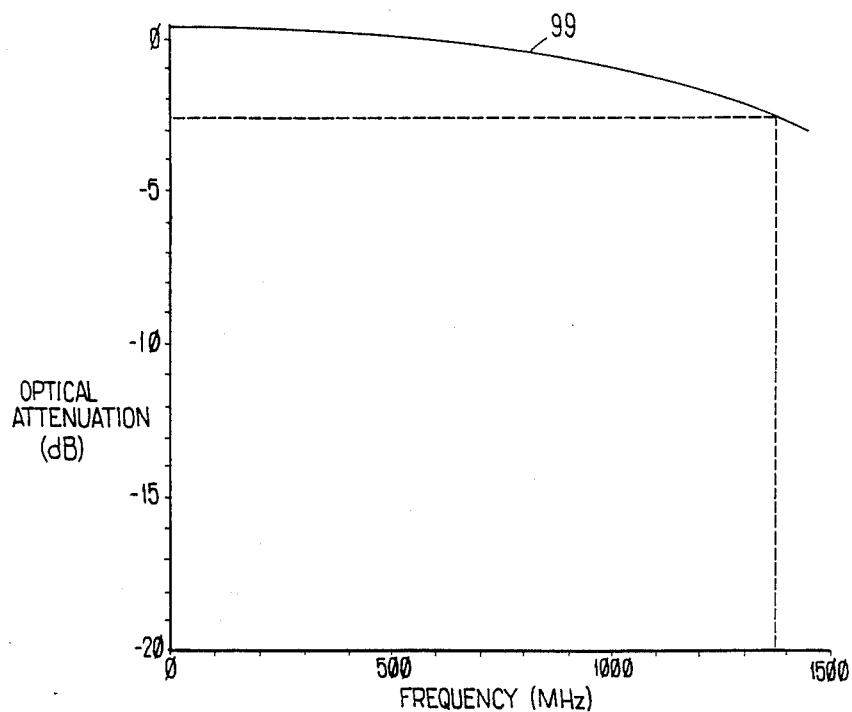
FIG A2B
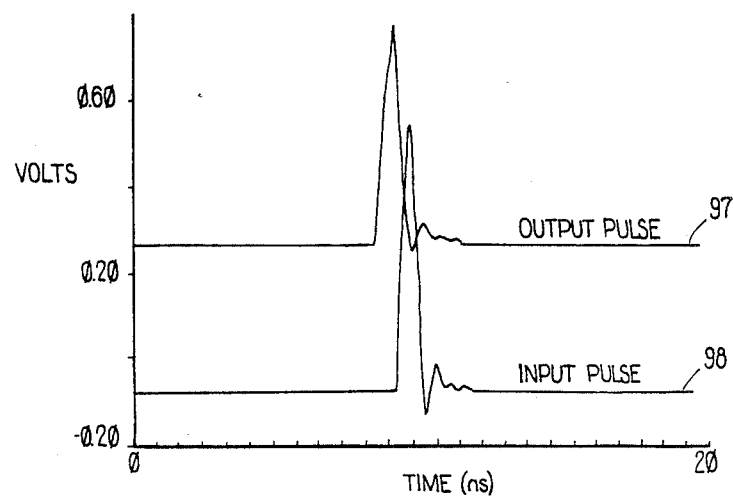
FIG A2A

METHODS OF MAKING OPTICAL FIBER AND PRODUCTS PRODUCED THEREBY

This application is a continuation-in-part of application Ser. No. 07/256,099, filed on Oct. 11, 1988 which is a continuation of application Ser. No. 07/079,732 filed on July 30, 1987, both abandoned.

TECHNICAL FIELD

This invention relates to methods of making optical fiber and the product produced thereby. More particularly, this invention relates to modified chemical vapor deposition methods of making relatively high bandwidth, low loss, multimode optical fiber.

BACKGROUND OF THE INVENTION

Optical communications systems, that is systems operating in the visible or near visible spectra, are now at an advanced stage of development. Such systems utilize glass fibers as the transmission medium. These fibers, generally having an overall cross-sectional diameter of about 125 μm, are generally composed of at least two portions, a central core and a cladding layer disposed about the core. The cladding layer has an index of refraction which is less than that of the core, with a typical index variation from core to clad being in the range from about 0.01 to 0.05. Optical fibers in use may be single-mode or multimode. The former is characterized by a sufficiently small core to accommodate efficiently only the first order mode. Such single-mode optical structures may have a core diameter of about 8 μm. Multimode optical fibers typically have cores which have a diameter in the range of about 50 μm to 100 μm.

Multimode optical fibers appeared to be on the wane but interest in them has been renewed recently, particularly for use in local area networks. The relatively large core facilitates splicing and permits more efficient energy coupling to a light energy source and to a repeater.

The introduction of many modes into or, alternatively, the generation of many modes within the optical fiber gives rise to a dispersion limitation which takes the form of a smearing due to the differing velocities of different order modes. Mode dispersion effects have been minimized by a continuous focusing structure. This structure takes the form of a fiber, the index of which is graded from a high value at the core center to a lower value at the cladding. The fundamental mode is generally confined to the highest index, corresponding to the lowest velocity region while higher order modes are confined generally to the relatively low index, corresponding to high velocity, regions.

A number of procedures have been utilized for manufacturing optical glass fibers. Most have yielded to procedures which in some way involve vapor source material. Typically, chlorides, hydrides, or other compositions of silica, as well as desired dopants, which tailor the index of refraction, are reacted with oxygen to produce deposits which directly or ultimately serve as glass source material from which optical fiber is drawn. Dopant materials include compositions with, for example, fluorine for lowering the index of refraction and germanium, titanium, aluminum, and phosphorous for increasing the index. Where the ultimate product is to be a graded multimode optical fiber, index gradation may be accomplished, for example, by altering the amount or type of dopant during deposition.

One technique for producing a lightguide fiber for use in communications is referred to as modified chemical vapor deposition (MCVD). It comprises directing a constantly moving stream of gas phase precursor reactants together with oxygen through a glass substrate tube having a generally circular cross-section. The oxygen stream carries silicon tetrachloride and dopants to produce the desired index of refraction in the finished optical fiber. The substrate glass is heated to a homogeneous reaction temperature within a moving zone of heat, also called a hot zone, that traverses constantly the length of the tube, and the consequent reaction produces doped silicon dioxide. The process involves homogeneous reactions that form particles away from the tube wall. The particles come to rest on the tube wall are fused into a continuous layer on the inner wall of the tube. For each pass of the moving hot zone, a layer of glass formation is deposited. The resulting tube is referred to as a preform tube. Homogeneously produced glass particles collect on the tube walls, and are fused into a continuous layer within the moving hot zone. With the usual heating means, there is a simultaneous heterogeneous reaction so that a glassy layer is produced within the moving hot zone by reaction at the heated wall surface. The substrate tube within which formation is taking place is continuously rotated about its own axis to enhance the uniformity of deposition about the periphery. See U.S. Pat. No. 4,217,027 which issued on Aug. 12, 1980, in the names of J. B. MacChesney and Paul B. O'Connor.

Continuous fusion within the hot zone and the resultant thickness uniformity of deposit facilitates the formation of an optical structure having a graded index of refraction. Gradients may be produced by varying the composition of the reactants with the ratio of high index-producing dopant increasing, in this instance, with successive hot zone traversals. The manufacture of a preform also includes altering the temperature and/or the flow rate during processing.

Initially, one end of the tube is supported in the headstock of a lathe and the other end is welded to an exhaust tube that is supported in the tailstock. Combustible gases are directed through a housing and nozzles of a torch assembly and toward the tube as it is turned rotatably about its longitudinal axis and as the torch assembly is moved therealong on a carriage to produce a moving hot zone. A temperature profile is produced across the hot zone which moves along on the surface of the tube, with a peak value sufficient to accomplish the desired reaction and deposition. See F. P. Partus and M. A. Saifi "Lightguide Preform Manufacture" beginning at page 39 of the Winter 1980 of the Western Electric Engineer.

During the deposition mode, the torch carriage moves slowly from the headstock of the lathe where dopants are moved into the glass tube to the tailstock where gases are exhausted. At the end of each pass from headstock to tailstock, the torch carriage is returned rapidly to the headstock for the beginning of another cycle and the deposition of another glassy layer.

Subsequent to the deposition mode, a collapse mode is used to cause the preform tube to become a solid rod-like member which is called a preform. It is this preform from which lightguide fiber is drawn. See D. H. Smithgall and D. L. Myers "Drawing Lightguide Fiber" beginning at page 49 of the hereinbefore identified Winter 1980 issue of the Western Electric Engineer. In order to collapse the preform tube, the torch assembly is moved in a number of passes from tailstock to headstock. The temperature of the moving hot zone which is higher during the collapse mode than during the deposition mode softens the tube wall and allows surface tension to cause the tube to collapse into a rod.

Preforms adequate for preparation of one or a few kilometers of optical fiber may be prepared during deposition periods of one or a few hours. These preforms are prepared by conventional processing from the deposited product to a final configuration which may be of rod shape. In usual processing, the tube which served as the deposition substrate becomes the cladding layer. It may, in accordance with the system, be composed of pure silica or of silica which has been doped to alter, generally to reduce, its index.

In the prior art MCVD, processes, a constant amount of silica is caused to be deposited in each layer during a pass of the torch. This is accomplished by controlling the concentration and flow rates of the gas phase precursor reactants. Disadvantageously, the resulting refractive index curve is characterized by a plurality of perturbations in amplitude across each layer. In a typical MCVD process-produced preform, about fifty layers are deposited. Contrasted to this, a preform which is made by some of other known technique may be made with two hundred or more passes.

The perturbations or ripples in the refractive index curve are indicative of substantial differences amplitude of the in index of refraction across each of the deposited layers. Significant perturbations in the refractive index curve result in the optical fiber having less than an expected bandwidth as well as additional loss. It is known that as the number of passes and hence the number of layers increases, the bandwidth increases.

Although the use of substantially more passes and hence more deposited layers improves the bandwidth of the resulting optical fiber, there is a drawback. Increased numbers of passes cause the process to become increasingly less economical.

What is desired and what seemingly is not available in the prior art are methods for making a preform from which may be drawn relatively high bandwidth, low loss multimode optical fiber. Such sought-after processes and apparatus should be capable of being integrated easily into conventional MCVD processes and apparatus.

SUMMARY OF THE INVENTION

The foregoing problems of the prior art have been solved by the methods of this invention. A method of making a preform, from which a relatively high bandwidth low loss optical fiber may be drawn, includes the making of a preform tube comprising a core and a cladding layer, wherein the cladding layer has an index of refraction of a value lower than the maximum index of the core for energy of the wavelength to be transmitted. A moving stream of a vapor mixture including at least one compound glass-forming precursor together with an oxidizing medium is flowed into a silica substrate tube which is supported for rotation about a longitudinal axis of the tube. The tube is caused to be rotated about its longitudinal axis while the tube is heated so as to react the mixture and produce a glassy deposit of silica on the inner surface of the tube wall. The heating of the tube and its contents is accomplished by a moving zone of heat produced by a correspondingly moving heat source external to the tube in that combustion within the tube is avoided and in that temperature within the zone of heat, the composition of the vapor mixture, and the rate of introduction of the vapor mixture are maintained at values such that at least a part of the reaction takes place within the gaseous mixture at a position spaced from the inner wall of the tube. This produces a suspension of oxidic reaction product particulate material whereby the particulate material which while traveling downstream comes to rest on the inner surface of the tube wall within a region which extends from a position within the zone of heat. The moving zone of heat serves the dual functions of providing a nucleation site for homogeneous reaction to produce particulate matter, and a consolidation site for previously produced particulate matter.

The deposition process such as the gas phase precursor reactants which are caused to be flowed into the tube and the temperature are controlled to cause the variation amplitude in the in refractive index across each deposited layer of each pass to be relatively small. This is accomplished by controlling the amount of silica deposited in each pass and by controlling other process parameters. A relatively large amount of silica is deposited in each initial pass after which the amount deposited in each pass ramps down so that the layers adjacent to the longitudinal centerline of the preform tube have substantially less silica than in the outermost deposited layers. Afterwards, the preform tube is caused to be collapsed into a rod and then optical fiber is drawn from the rod. For multimode optical fiber which is made in accordance with this invention, the loss is less than the loss in an optical fiber drawn from a preform tube in which substantially constant volume layers of silica are deposited. Also, the bandwidth of the optical fiber is substantially higher.

BRIEF DESCRIPTION OF THE DRAWING

Other features of the present invention will be more readily understood from the following detailed description of specific embodiments thereof when read in conjunction with the accompanying drawings, in which:

FIGS. 5A-5B and 6A-6B depict simplified layer structures for preform tubes and preforms which have been made in accordance with a conventional MCVD process and with the methods of this invention, respectively;

FIG. 8 is a graph which depicts flow rates of constituents used in the deposition process of this invention plotted against the deposition layer number;

FIG. 9 depicts a histogram of loss distribution at a wavelength of 1.3 μm of optical fibers drawn from preforms which have been made in accordance with this invention;

FIGS. 12A and 12B depict transmitted and received pulses, with the associated Fourier Transform, using optical fiber made in accordance with this invention.

DETAILED DESCRIPTION

Figure 1:
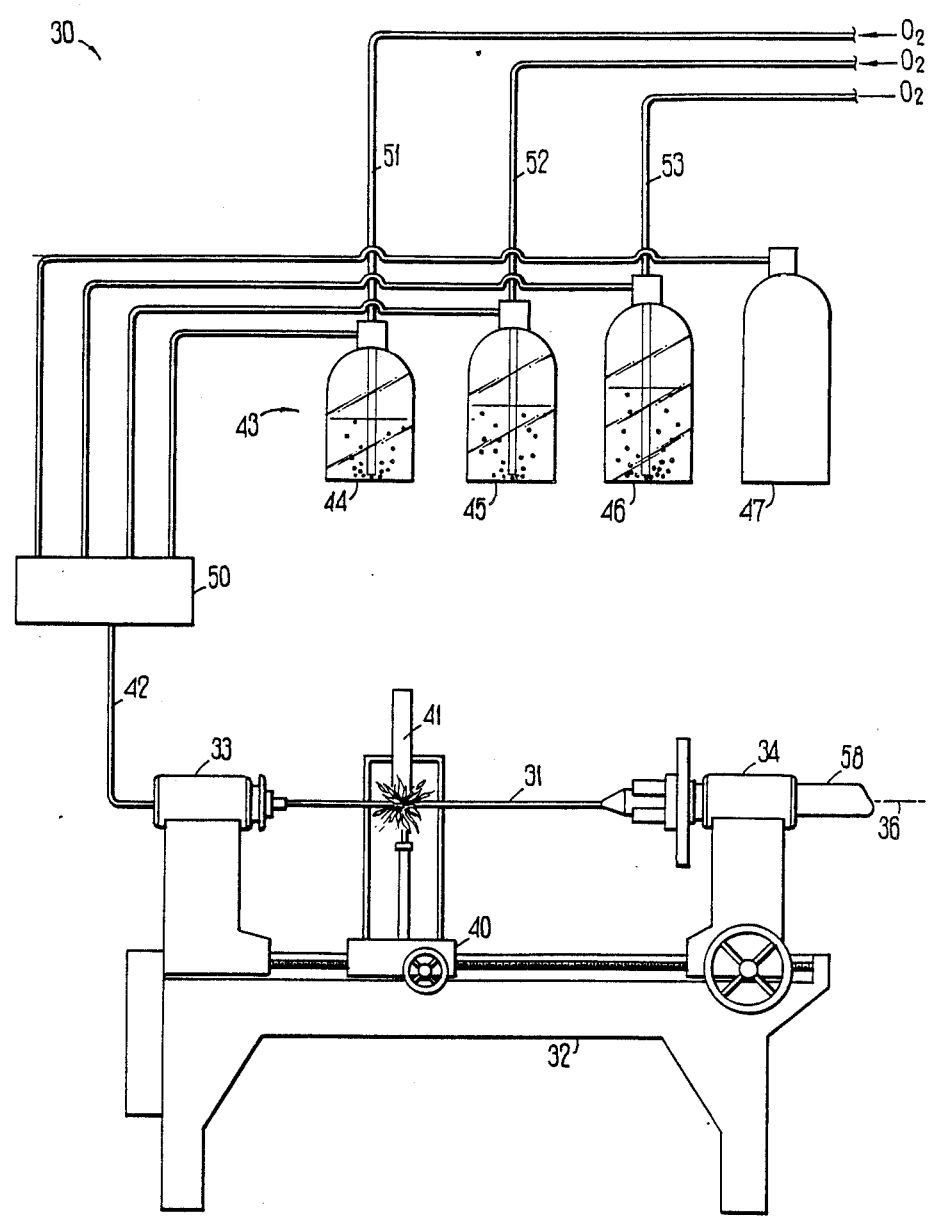
FIG. 1 is a front elevational view of an apparatus which is suitable for practicing a deposition process in accordance with this invention.

Referring now to FIG. 1 there is shown an apparatus, designated generally by the numeral 30, for heating and collapsing a glass substrate tube 31 to manufacture a silica glass rod, which is called a preform, from which a lightguide fiber is drawn. During a deposition mode, the substrate tube 31 is heated in order to cause the reaction products of gasses and/or dopants being fed into the tube to be fused to the inside wall thereof to provide a preform tube having an optically suitable profile for communications use. This process is referred to as modified chemical vapor deposition and is described in priorly mentioned U.S. Pat. No. 4,217,027 which is incorporated by reference hereinto. In this description, the numeral 31 is used to designate both the substrate tube and the preform tube. The heating of the glass tube 31 is carried out while gas phase reactants are delivered to the tube. A system for this delivery is disclosed in U.S. Pat. No. 4,276,243 which issued on June 30, 1981, in the name of F. P. Partus.

Figure 2:
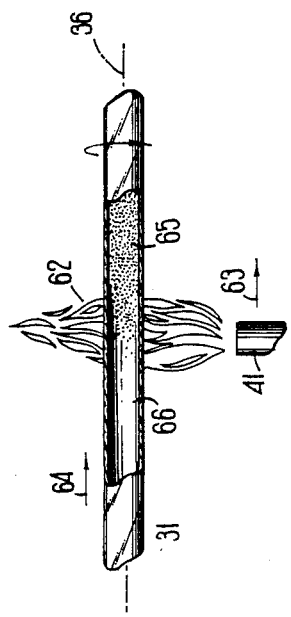
FIG. 2 is a front elevational view of a section of a glass substrate tube depicting observed conditions during processing.

The apparatus 30 generally comprises a lathe 32 having a headstock 33 and a tailstock 34 which are used to support the glass starting tube 31 for rotation about its longitudinal axis 36 (see FIG. 2). The lathe 32 also includes a carriage 40 which is mounted for reciprocal movement along the lathe. Mounted on the carriage 40 is a torch assembly which is designated generally by the numeral 41. The torch assembly 41 may be that shown in U.S. Pat. No. 4,231,777 or 4,401,267.

A gaseous material is introduced into the tube 31 through an inlet tube 42 which is, in turn, connected to a source material reservoir 43. The gaseous material includes precursor reactants such as silicon tetrachloride, germanium tetrachloride, phosphorus oxychloride and dichloro di-fluoro methane which are flowed from containers 44, 45, 46, and 47, respectively, along individual lines to a manifold 50. The deposited layers of silica are generally doped with germanium, phosphorus or fluorine. Such a reservoir may include an oxygen inlet (not shown) which is connected to the manifold 50. The containers 44, 45, and 46 normally hold liquid reactant materials which are introduced into the tube 31 by means of carrier gas introduced through inlets 51, 52, and 53 with the arrangement being such that the carrier gas is bubbled through the liquids. Exiting material is exhausted from the tube 31 through an outlet 58. Not shown is an arrangement of mixing valves and shut off valves which may be utilized to meter and to make other necessary adjustments in composition. The apparatus of FIG. 1 is arranged so that the longitudinal axis of the tube 31 is generally horizontally disposed.

FIG. 2 is a front elevational view of a section of a substrate tube 31 as observed during deposition. Depicted is a portion of the torch assembly 41 which is constantly being moved with the carriage 40 to produce a moving zone of heat 62 (see also FIG. 3), or a hot zone as it is called commonly, which is traversing the tube 31 in a number of passes in the direction shown by arrow 63. The zone of heat 62 is a length of the tube 31 along which the temperature profile is formed by the torch assembly 41 as it passes along the tube. Gaseous material is introduced at the left end of tube 31 at the headstock end of the lathe and flows in the section of FIG. 2, which is broken away for purposes of clarity, in the direction shown by arrow 64. For typical MCVD processing conditions, two regions are clearly observable. A zone 65 downstream of the moving hot zone 62 is filled with a moving powdery suspension of particulate oxidic material, while a region 66, devoid of such particulate matter, defines the region within which fusion of previously deposited material is occurring.

The torch assembly 41 is adapted to cause a flow of combustible gases to produce flames which are directed toward the outer surface of the tube 31. By confining the heat from the burning gases to a desired surface area of the tube, the torch assembly 41 establishes the zone of heat 62 (see FIG. 3) having a temperature profile 71 at the surface of the tube. The mounting of the torch assembly 41 on the carriage 40 and its movement relative to the tube 31 causes the zone of heat to be moved along the length of the tube. The torch assembly 41 is supported from and is mounted on the carriage 40. Through adjustments of a supporting bracket, the torch assembly 41 may be moved within any one of a range of distances from the tube 31 or to any one of a plurality of positions about and spaced from the tube. The capability of adjusting the torch in a transverse direction aids in the control of the temperature profile along successive portions of the rotating tube as the torch assembly is moved along the length of the tube during a deposition mode.

Figure 3:
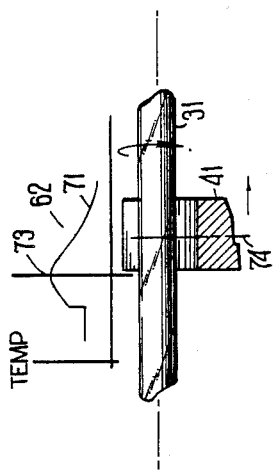
FIG. 3 is an enlarged portion of a torch assembly and showing a temperature profile across a zone of heat which traverses a substrate tube.

The flows which are emitted to the surface result in flames which provides a temperature profile that facilitates the deposition of doped silicon dioxide, for example, on the inner surface of the tube 31 and subsequent collapse. The torch assembly 41 produces a zone of heat 62 (see FIG. 3) with temperature ranging from about 1600° C. during a deposition mode to about 2200° C. during a collapse mode. As can be seen in FIG. 3, the zone of heat 62 extends ahead of the torch assembly 41 and behind it. Because the torch assembly 41 moves along the tube 31, a maximum temperature 73 within the zone of heat trails a centerline 74 of the torch assembly 41. Assuming that no adjustments to gas flow controllers is made, the faster the torch assembly is moved, the greater the distance between the maximum temperature 73 of the heat zone and the centerline 74 of the torch assembly.

Oxygen reacts with the silicon tetrachloride and appropriate dopants. Predominantly oxides of silicon tetrachloride and dopant form as they enter the hot zone. Downstream of the torch, the tube is relatively cool and oxide particles are deposited there and fused later by the moving torch. The remaining reaction products are exhausted at the tailstock and of the lathe.

It has been customary in the art to deposit substantially equal volume layers of silica inside the tube 31. Inasmuch as the diameter of each successive layer decreases from the previous one, the thickness of each successive layer in the preform tube increases slightly. It should be understood that the thickness changes between layers in the preform tube 31 are slight but are exaggerated in FIG. 5A for purposes of clarity. The prior art process of depositing constant volume layers of silica causes the thicknesses of the inner layers to be greater than the thicknesses of the outer layers (see FIG. 5A). For example, the thickness of an innermost layer 77 in FIG. 5A is greater than that of an outermost layer 78. Of course, when the preform tube 31 is collapsed into the preform 80, the thickness differences become more pronounced (see FIG. 5B).

Figure 4:
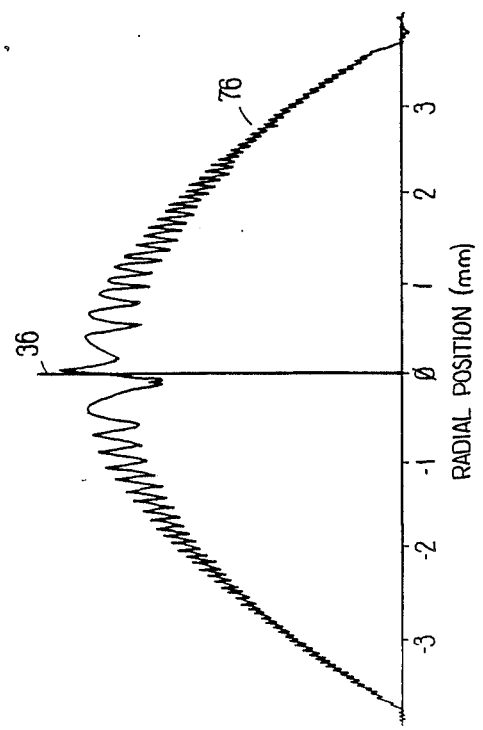
FIG. 4 depicts an index profile of a preforms made by a conventional MCVD process.

Multiple passes are used to provide a graded index of refraction profile. As can be seen in FIG. 4, the amplitude of the perturbations or ripples in the refractive index profile is very pronounced in those layers closest to the longitudinal axis of the preform which is the longitudinal axis 36 of the glass starting or substrate tube. Higher deposition rates usually result in a smaller number of thick layers significant pertubations (see FIG. 4) and an index profile 76 having significant pertubations (see FIG. 4).

After the deposition of a plurality of layers of silica inside the substrate tube 31 to provide a preform tube (see FIG. 5A), the preform tube is caused to be collapsed by well known methods such as that described in the previously identified Winter 1980 issue of the Western Electric Engineer or in U.S. Pat. No. 4,486,214 which issued on Dec. 4, 1984 in the names of B. Lynch, et al. and which is incorporated by reference hereinto. The moving torch assembly 41 is used to heat the tube to a temperature in the range of about 2200° C. for a fused silica tube. Surface tension and/or external pressure cause the tube to shrink rapidly and collapse into a solid rod 80 (see FIG. 5B) which is referred to as a preform. Subsequently, optical fiber is drawn from the preform and taken up as is shown, for example, in U.S. Pat. No. 4,370,355 which issued on Jan. 25, 1983 in the name of P. J. Niesse and which is incorporated by reference hereinto.

The theoretical bandwidth that can be achieved in multimode optical fiber produced by MCVD is on the order of about 10 GHz-Km. Typically, however, the maximum bandwidth achieved on production optical fiber is on the order of about 1.5 GHz-Km. As mentioned hereinbefore, the pronounced amplitude of the perturbations of the refrative index in those layers adjacent to the longitudinal axis of the substrate tube (see FIG. 4) causes a reduction in bandwidth.

What Applicants have recognized is the need to reduce the amplitude of the ripple in the refractive index across each layer. The problem of the amplitude variation in the refractive index across each layer may be overcome by using a higher level of phosphorus, but this remedy only leads to other problems. For example, the higher the level of phosphorus, the more apt the material is to react with the atmosphere and cause the appearance of moisture in the resulting preform. This results in a degradation of the performance of optical fiber drawn therefrom, particularly after a period of use. Moreover, the use of excessive amounts of phosphorus causes the resulting optical fiber to have a radiation resistance problem. Under exposure to environmental radiation, broken bonds associated with the phosphorus form color centers which result in increased loss. Still further, the use of excessive levels of phosphorus affects adversely the shape of the optical fiber; the higher the phosphorus level, the greater the ovality of the drawn fiber. This of course, causes problems in interconnection.

These problems may be overcome by suitable control of the conventional MCVD process. A necessary but not sufficient manner of reducing the amplitude variation of the index of refraction within each layer is to depart from the deposition of a constant volume of silica in each pass of the torch which results in equal volume layers of silica. In the constant volume process, the thickness of each layer beginning from that contiguous to the clad in a direction toward the longitudinal axis of the preform tube 31 increases (see again FIG. 5A). The process of this invention is controlled such as, for example, the volume of silica deposited in each layer to cause the amplitude variation in the index of refraction across each layer to be relatively small. This may require that the volume of silica deposited in one layer differs from that in another layer. As a result, the amplitude of the perturbations on the index of refraction curve is reduced which results in an increased bandwidth. Further this causes the total loss of the optical fiber drawn from the preform 80 to be significantly less than that for optical fiber silica with larger perturbations of refractive index amplitude.

In one embodiment, the process is controlled to cause the volume of silica deposited in each successive pass is ramped down in such a manner as to cause the thickness of a layer 81 (see FIG. 6A) contiguous to the cladding layer or substrate tube to exceed that of the innermost layer 82. In that embodiment, the outermost layer 81 typically has a thickness which is greater than that of the innermost deposited layer made by conventional MCVD processes wherein undesirably high amplitude perturbations occur within each step of the refractive index curve. Also, the thickness of the innermost layer 82 which is deposited in the preform tube 31 shown in FIG. 6A and deposited in the one embodiment of this invention is about one third that of the innermost layer 77 of a typical preform tube 31 of FIG. 5A made by a conventional MCVD process. In FIG. 6B there is shown the preform tube 31 of FIG. 6A after it has been collapsed into a preform 80. It should be understood that the thickness of the outermost layer 81 of the preform 31 of FIG. 6A in accordance with this invention may be greater or less than that of the outermost layer 78 of FIG. 5A. What is important is that in the process of this invention process parameters, such as the amount of silica deposited in each layer, are controlled to control the amplitude variations of the index of refraction within each layer.

Figure 7:
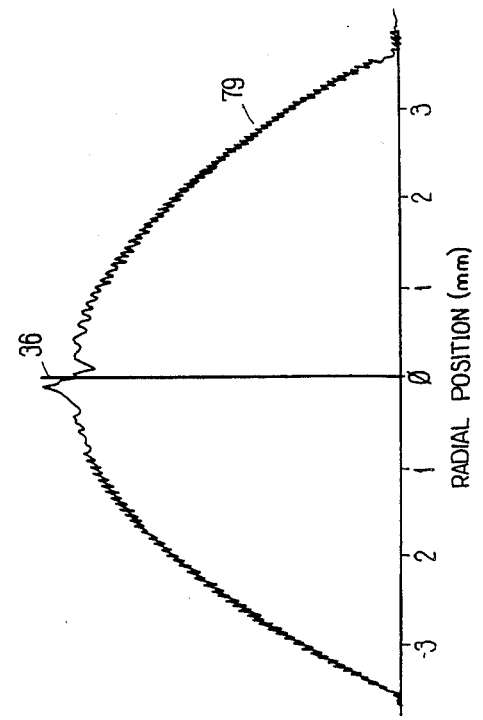
FIG. 7 depicts the refractive index profile of a preform which is made by the methods of this invention.

Going now to FIGS. 4 and 7, it can be seen that the refractive index profile 76 of a preform which is made in accordance with conventional MCVD processes includes perturbations in the amplitude of the index of refraction in layers adjacent to the longitudinal axis 36 are substantially greater in amplitude than corresponding perturbations of a preform made in accordance with this invention (see profile designated 79 in FIG. 7). The characteristics of the perturbations in the index of refraction curve are a function of the amount of heat applied during deposition, the amount of silica deposited in each layer, and the chemistry of the processing conditions. Because the layer deposits are made inside the substrate tube 31 and beat is applied to an outer surface of the tube, it is far easier to apply the thinner layer of the prior art contiguous to the clad than the thicker layer of the process of this invention. However, the increase in thickness is not that great and because that outermost layer is the layer closest to the heat source, the layer is deposited with relative ease. On the other hand, it is difficult to deposit a constant volume innermost layer because it is farthest from the heat source. In the one embodiment of this invention described hereinbefore, the innermost layer is thinner than those deposited with conventional MCVD processes, and less heat is required to sinter that deposit. In an example made in accordance with the hereinbefore described one embodiment, it has been determined that the amplitude variations of the most significant perturbations in the index of refraction curve adjacent to the longitudinal axis of a preform tube produced by conventional MCVD techniques are about three times those of the innermost layers deposited in accordance with the methods of this invention.

Viewing now FIG. 8, it can be seen that with a constant layer volume of silica method of deposition (see broken line designated 84 in FIG. 8), the germanium doping constituent is increased in a non-linear fashion, as shown by a broken line curve designated 85. As also can be seen from FIG. 8, a line designated 86, represents a ramped down silica deposit schedule in accordance with the one embodiment of this invention. Accompanying such a planned silica deposit is a germanium tetrachloride level which is non-linear (see curve designated 87 in FIG. 8) but which levels off after a layer disposed between the first and last layers. The index of refraction is affected by the concentration of germanium in a solution of germanium and silica. There exists the freedom to decrease the silica, but the amount of germanium must be determined to obtain the desired refractive index profile.

Referring now to FIG. 9, there is shown a distribution of losses at a wavelength of 1.3 $\mu$m. Comparing the refractive index profile curves of FIGS. 4 and 7, it can be seen that the outer portions of the two curves have similar patterns of amplitude variataion of the refrative index. However, the center halves of the two curves differ markedly and hence the loss for optical fiber made in accordance with the conventional process is greater than that for the new.

Figure 10:
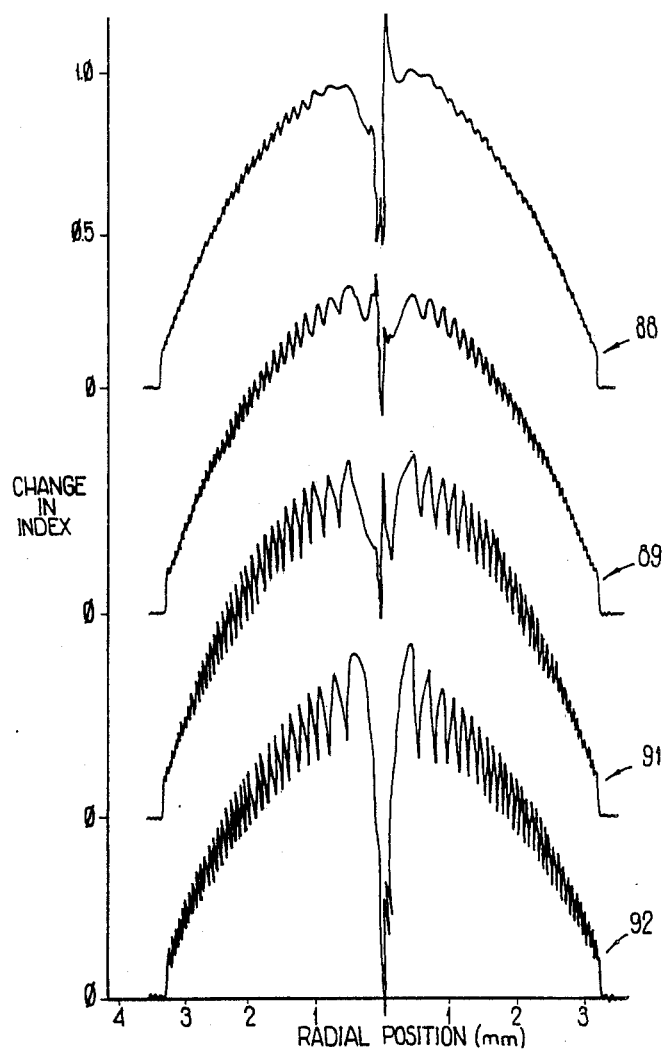
FIG. 10 shows index of refraction profiles for preforms wherein processing conditions changed from one profile to another.
Figure 11:
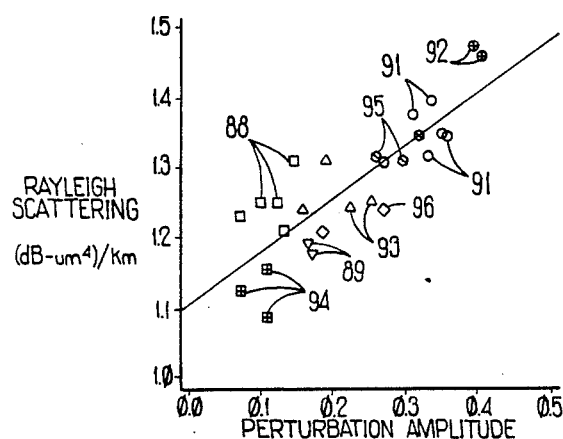
FIG. 11 depicts a curve which relates Rayleigh scattering loss to ripple amplitude on an index of refraction curve.

What is important to recognize is that the refractive index profile of a preform is affected by processing conditions used during either deposition or collapse. Profiles designated by the numerals 88, 89, 91, and 92 are shown in FIG. 10 and differ only in the processing conditions, not in the chemistry. Each of these curves characterizes a preform made by constant volume in each layer deposition. As mentioned earlier herein, phosphorus content also affects the layer structure and the changes in layer structure appear to be similar in magnitude to those found for the processing variations. Various preforms produced using different processing conditions during collapse or deposition or having different phosphorus contents were drawn into optical fiber and the spectral loss of the fibers was measured. The magnitude of the amplitude variation in the refractive index in each layer structure can be characterized from the preform profile with a normalized perturbation amplitude defined as the difference in the change of refractive index across a layer divided by the average change in refractive index for that layer. The correlation between Rayleigh scattering and layer structure is shown in FIG. 11 wherein values of the Rayleigh scattering coefficient are plotted against values of the normalized perturbation amplitude. Points 88, 89, 91, and 92 on the graph shown in FIG. 11 correspond to the preforms of FIG. 10 made with differing processing conditions whereas points designated 93, 94, 95 and 96 correspond to optical fiber samples drawn from preforms made with differing phosphorus levels. As can be seen, the effect of layer structure on Rayleigh scattering is large and does not depend on how the layer structure is changed.

The process of this invention provides an optical fiber having increased bandwidth. Whereas a typical bandwidth for optical fiber made in accordance with conventional MCVD processes without regard to the control of refractive index amplitude variation in each layer is about 1.5 GHz-Km, it is about 2.4 GHz-Km for that made with the process of this invention. In some instances, optical fiber made in accordance with this invention has achieved a bandwidth of over about 6.0 GHz-Km which approaches the theoretical limit for multimode optical fiber. This advantage translates into the preservation of pulse shape during transmission. With conventional multimode optical fiber, the received pulse differs from the transmitted pulse because of distortion. As can be seen from the time domain curves in FIG. 12A, the shape of a received pulse 97 for the optical fiber of this invention is substantially the same shape as that of a transmitted pulse 98, even after traversing 2.4 kilometers. In FIG. 12B, there is shown a graph 9 of optical attenuation versus frequency which represents a calculation of bandwidth from the information in the curves of FIG. 12A.

Advantageously, the bandwidth of an optical fiber drawn from a preform produced in accordance with the methods of this invention is less sensitive to the method of exciting the optical fiber than those produced by prior art MCVD processes. For example, excitation by a truncated as opposed to a uniform power distribution affects much less the bandwidth of optical fiber drawn from a preform made by the methods of this invention than one drawn from a preform made by a prior art MCVD process.

Another benefit is provided by the one embodiment of this invention in which the amount of silica is controlled in a manner which results in a decreasing thickness from the cladding inwardly. For a given thickness of a deposited layer inside the substrate tube 31, there is a minimum temperature which is needed to sinter the deposited material and a maximum temperature below which unwanted bubbles are not formed. By reducing the thickness of the layers from the outermost to the innermost layers, the temperature needed to sinter the innermost layers is reduced and is reduced to a value well below that at which bubbles are formed in the perform tube. With the relatively thick innermost layers of prior art MCVD process, more heat energy is required to be conducted through the tube wall, the priorly deposited layers and the thickness of the innermost layer itself thereby increasing the possibility of bubble formation.

Also, it has been found that, the deposition rate can be increased by using the methods of this invention. In the one embodiment, it has been found that the deposition rate for the first several outermost layers in accordance with the methods of this invention may be about two to three times that for the outermost layer of conventional MCVD processes. On the other hand, the deposition rate for the innermost layer 82 of FIG. 6A may be about two-thirds that of the conventional MCVD processes. The net average result is a higher rate for the methods of the invention. For example, whereas in the prior art MCVD process, a deposition rate of about 1.0 gm/min. for a 19×25 mm tube was expected, average deposition rates for the process of this invention are about 1.25 to 1.5 grams per minute. Also, it should be apparent that the methods of this invention may be useful in producing single-mode, as well as multimode optical fiber.

From the foregoing, it is concluded that the methods of this invention in which the amplitude variation in refractive index across each layer result not only in increased bandwidth but also in reduced loss. As a result, the optical fiber which is drawn from a preform made in accordance with this invention yields results comparable to those achieved by depositing significantly more layers within a tube than in a conventional prior art MCVD process but at lower deposition times and costs.

It is to be understood that the above-described arrangements are simply illustrative of the invention. Other arrangements may be devised by those skilled in the art which will embody the principles of the invention and fall within the spirit and scope thereof.

What is claimed is:

1. A method of producing an optical fiber having a relatively smooth refractive index profile, said method including the steps of:
   providing a preform from which optical fiber may be drawn, said step of providing including the steps of:
   supporting a substrate tube for rotation about its longitudinal axis;
   causing the tube to rotate about its longitudinal axis;
   moving a source of heat along the tube in a plurality of passes during each of which a layer of glassy material is deposited; while
   controlling the deposition of glass material within the tube control the amplitude variation in the index of refraction within each layer, said step of controlling including flowing gas phase precursor reactants into the tube and controlling the temperature to cause reaction products to be deposited as layers of glassy material inside the tube such that the variation in amplitude of the refractive index across each deposite layer is relatively small; and
   collapsing the substrate having the deposited layers therein to provide a preform; and
   drawing optical fiber from the preform.

2. The method of claim 1, wherein the loss for optical fiber which is drawn from the preform is significantly less than that of optical fiber which is drawn from a preform made from a preform tube in which substantially constant volume layers of glassy material had been deposited.

3. The method of claim 2, wherein the concentration levels of the precursor reactants are controlled.

4. The method of claim 2, wherein the step of flowing is accomplished by controlling the flow rate and the concentration levels of the precursor reactants.

5. The method of claim 2, wherein an outermost layer of glassy material deposited in the substrate tube has a thickness which is substantially greater than an outermost layer in a substrate tube having substantially constant volume deposits of glassy material therein.

6. A method of providing an optical fiber which includes a core and a cladding wherein the cladding has an index of refraction of a value lower than the maximum index of refraction of the core for energy of the wavelength to be transmitted, said method including the steps of:
   providing an optical preform which includes the steps of:
   introducing a moving stream of a vapor mixture including at least one compound glass-forming precursor together with an oxidizing medium into a glass substrate tube; while
   subjecting successive increments of length of the tube to a zone of heat in each of a plurality of passes of the zone of heat along the length of the tube react the mixture and deposit a plurality of layers of silica within the tube with an innermost one of the layers being in engagement with an inner surface of the tube, the temperature within the zone of heat, the composition of the vapor mixture and the rate of introduction of the vapor mixture being maintained at values such that at least a part of the reaction occurs within the gaseous mixture at a position spaced from the inner wall of the tube thereby producing a suspension of oxidic reaction product particulate material which while traveling downstream comes to rest on the inner surface of the tube within a region which extends from a position within the zone of heat, the moving zone of heat providing nucleation sites for previously produced particulate matter;
   the deposition of layers within the tube being controlled to control the amplitude variation in the index of refraction within each layer and including causing the volume of silica in layers of silica which are formed inside the tube to vary in a predetermined manner to cause amplitude the variation in refractive index within each layer to be relatively small; and
   collapsing the substrate tube having the deposited layers therein to form a preform; and
   drawing optical fiber from the preform.

7. The method of claim 6 wherein the loss for optical fiber which is drawn from the preform is significantly less than that of optical fiber which is drawn from a preform made from a substrate tube in which substantially constant volumes of silica had been deposited.

8. The method of claim 6, wherein germanium tetrachloride and silicon tetrachloride are flowed into the tube and the germanium tetrachloride is caused to react with the silicon tetrachloride and the rate of flow of the germanium is decreased for each layer in a direction toward the longitudinal axis of the tube and the silicon tetrachloride is flowed in successively decreasing amounts.

9. The method of claim 8, wherein the decrease in volume of silica as between layers is controlled to cause the volume to decrease in a substantially constant manner.

10. The method of claim 9 wherein the optical fiber which is drawn from the optical preform has a bandwidth of at least about 2.4 GHz-Km.

11. The method of claim 8, wherein the thicknesses of outermost layers of silica in the preform are greater and of the innermost layers are less than those of a preform in which the volume of silica deposited in each layer is substantially constant.

12. The method of claim 8, wherein the decrease in volume of silica between layers is controlled to cause the volume to decrease generally exponentially.

13. The method of claim 6, wherein the tube has an inner diameter of 19 mm and an outer diameter of 25 mm and the deposition rate is about 1.25–1.5 gms/min.

14. A method of producing a preform from which optical fiber having a relatively refractive index profile may be drawn, said method of including the steps of:
   supporting a tube for rotation about a longitudinal axis thereof; causing the tube to be rotated about its longitudinal axis;

moving a source of het along the tube to provide a zone of heat which is moved in a plurality of passes along the length of the tube; and flowing gas phase precursor reactants into the tube to cause reaction products to be deposited as layers of glassy material inside the tube; while controlling the deposition of glass material within the tube to control the amplitude variation in the index of refraction and cause the variation in refractive index across the deposited layer of each pass to be relatively small; and collapsing the tube to provide a preform.

15. The method of claim 14, wherein the volume of silica which is deposited in each pass decreases from the first pass to the last pass.

16. The method of claim 14, wherein the decrease in volume of silica as between layers is controlled to cause the volume of to decrease in a substantially constant manner.

17. The method of claim 15, wherein the thicknesses of outermost layers of silica in the preform tube are greater and of the innermost layers are less than those of a preform in which the volume of silica deposited in each layer is substantially constant.

18. An optical fiber which is made in accordance with the method of claim 1.

19. A multimode optical fiber which is made in accordance with the method of claim 6.

* * * * *